July 25, 1939.　　　U. S. JENKINS　　　2,167,211
METHOD OF DISTILLING
Filed June 30, 1924　　2 Sheets-Sheet 1
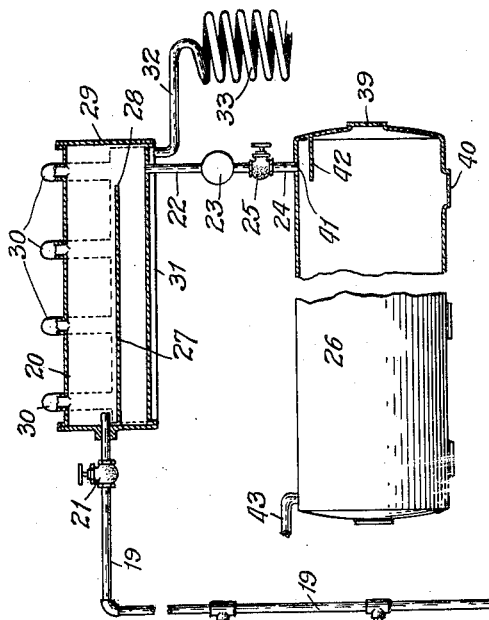
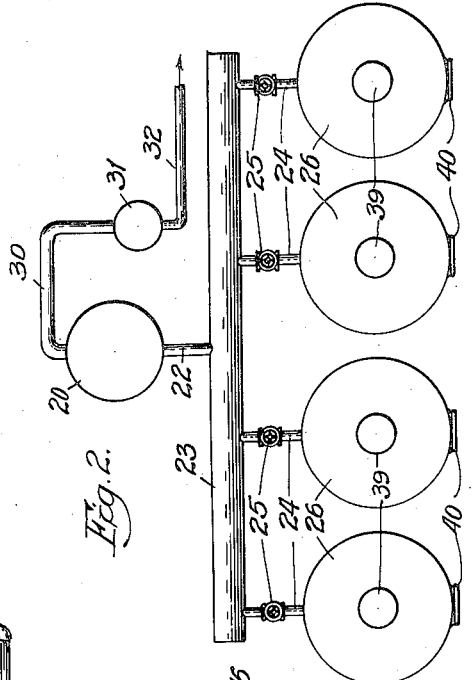
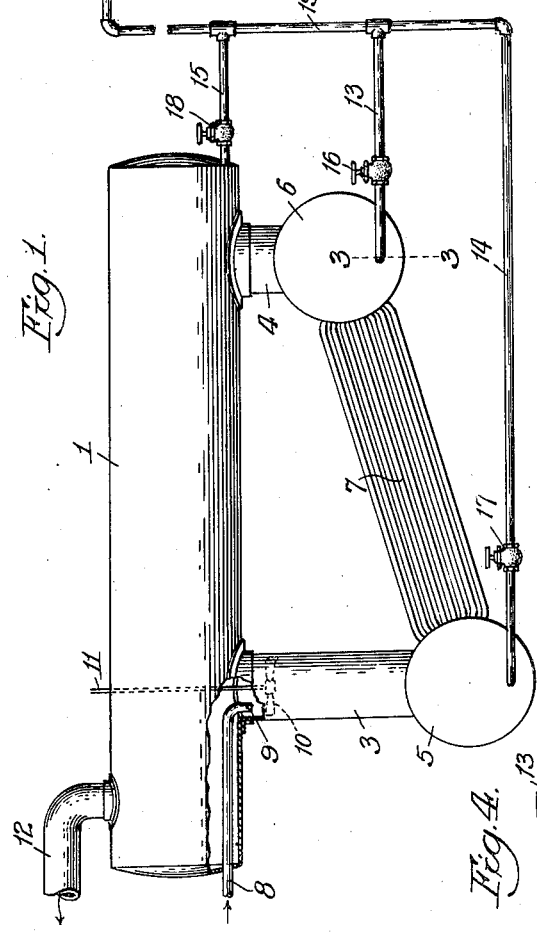
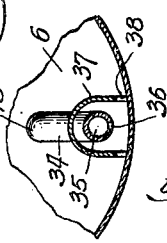
Inventor:
Ulysses S. Jenkins,
by Wallace R. Lane.
Atty.

July 25, 1939. U. S. JENKINS 2,167,211
METHOD OF DISTILLING
Filed June 30, 1924 2 Sheets-Sheet 2
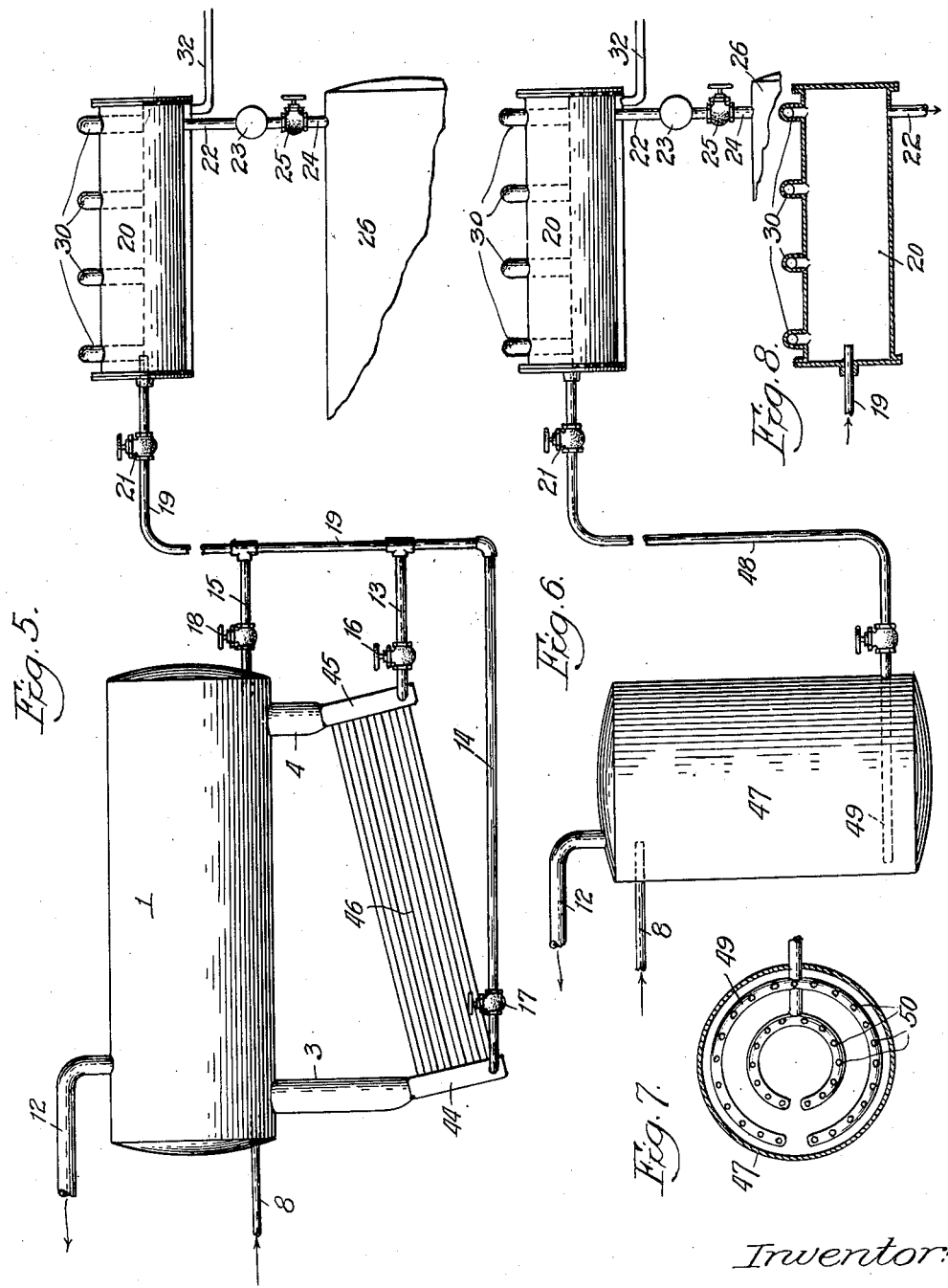
Inventor:
Ulysses S. Jenkins,
by Wallace R. Lane.
Atty.

Patented July 25, 1939

2,167,211

UNITED STATES PATENT OFFICE 2,167,211

METHOD OF DISTILLING

Ulysses S. Jenkins, St. Louis, Mo., assignor, by mesne assignments, to Jenkins Petroleum Process Company, Chicago, Ill., a corporation of Illinois Application June 30, 1924, Serial No. 723,144

29 Claims. (Cl. 196—55)

The present invention relates to a method of distilling.

While the invention has reference to the distilling of any substance or material, yet for illustrating the utility and mode of operation of the invention, it is herein described and upon the drawings shown, in connection with the distilling or cracking of hydrocarbon oils, such as petroleum, crude oil, shale oil and other like and similar substances.

In the cracking of oil, a residue or residuum is usually formed in the still, and it is comprised partly of carbon and a certain amount of uncracked oil. When this substance cakes and adheres to the walls of the still or other reaction chamber or container, it is necessary to stop the distilling run and enter the still to remove the deposit with required tools, thus causing a shutting down of the plant between runs.

The present invention contemplates the elimination of the above disadvantages and has among its objects the provision of means for and method of distilling continuously for indefinite periods without the necessity of stops or shutdowns of the plant; to provide for a more efficient operation and increased out-put of the plant; to provide for preventing the accumulation and depositing of carbon or other hard substances in the still, or other parts of the apparatus, by the carrying off of the carbon and the like as rapidly as the same may be formed; to prevent the formation of hard and difficultly removable residuum; to provide for feeding the oil to and through the still continuously, preferably at a greater rate than the distilling thereof may occur, whereby there may be an excess of oil which, when drawing off from the still, will carry the carbon and similar or other substances therewith; to provide for regularly supplying, as continuously or intermittently, an adsorptive substance capable of rendering the carbon into a colloidal or similar form so that the carbon or adsorbent, as well as the excess oil, may be readily and continuously carried away; to provide for continuously causing a flow or travel of the oil and suspended or included substances through and from the still during the action of the still, preferably under pressure and in the presence of heat; to provide for conducting or flushing out the carbon and included substances, with or without adsorbent, and with or without oil, to an evaporator for further distilling and cracking action, preferably subjecting the flushed or removed material conducted, to reduced pressure, above, at or below atmospheric pressure, whereby the contained energy or heat in the flushed or removed material will act to separate out or extract distillates therefrom; to provide for exposing or spreading this flushed or removed material, which may be termed as wash oil or initial or primary residuum or flush, to or over a large area surface, such as the interior wall of the evaporator or a plate or diaphragm located therein, whereby the extraction or separation of distillates may be increased and readily effected; to provide for conducting off the flush, which may be termed the intermediate or secondary residuum or flush, to a settling device or receptacle or chamber, while the distillates are being conducted or taken off to a suitable condensing device; to provide for controlling or regulating the travel or flow of the primary and secondary flushes respectively to the evaporator and settling receptacle, and hence, the pressures to which they may be subjected; to provide for a controlled travel of the flush, which may be termed the final flush or settlings, in the settling receptacle whereby the carbon, and other substances, such as adsorbents and their reaction products, etc., may settle in the receptacle so as to leave in the upper part of the receptacle the undistilled oil with as little carbon or adsorbent constituent as possible, or none at all; to provide for baffling the inflow of the intermediate flush into the receptacle, preferably in the form of a plate located opposite and near the inlet to the receptacle, so as to prevent formation of currents in the flush contents of the receptacle; to provide for drawing off or decanting the oil or unsettled part of the contents of the receptacle; to provide means for the ready removal of the settled contents of the receptacle; to provide for operating the vaporizer and the settling device continuously with and during the operation or action of the still; to provide for selectively drawing off the primary residuum or flush in the still from any desired point thereof; to provide for selectively conducting the secondary residuum or flush to any one or more settling devices; to provide for a novel distilling apparatus preferably comprising a still, an evaporator and a duct for conducting the flush of the former to the latter for separation of further distillates; to provide for controlling the flow of the flush through such duct; to provide for a novel apparatus including a separating means for the distillates and the flushed material formed in the evaporator; to provide for a novel evaporator; to provide for a novel settling device; to provide for the holding in suspension and dispersion of carbon in a mixture of carbon and oil by the use of an adsorbent; to provide for a fluidal carrier for the suspended and included material or substances by supplying an excess of oil in the still and other parts of the apparatus, whereby the colloidal and suspended matter may be continuously carried off and flushed out from the apparatus and parts thereof, such as the still and evaporator; to provide for a novel outlet means for the flush; and to provide for such other objects, advantages and capabilities as will later more fully appear and are inherently possessed by the invention.

The term residuum herein is not used in the sense of a settling or sedimentation as has been usual heretofore, but in this case it has a particular meaning and covers the liquid and suspended matter taken from any part of the device and in contradistinction to the vapors and fixed gases which may be taken from several and different points of the device as required. The term is better expressed by the word "flush" or the expression "flushed material," and it includes material which may be introduced into the system or circuit, such as the adsorbent or adsorptive substance, and suspended or similar material which may be formed in the circuit or system. Also, this substance, which is in a fluidal condition, when withdrawn or flushed or scavenged from any part of the circuit of the equipment or apparatus, under pressure, will contain dissolved fixed gases and vapors held in solution or the like by virtue of such pressure, at the points or loci of withdrawal or flushing out. The character of this residuum or "flush" withdrawn or flushed-out from the point or points of draw-off may vary. These different portions of the flushed material are termed "first or initial," "second or intermediate" and "third or final." The latter is in the nature of settlings and this is the first locus where there is any such condition.

Referring to the drawings, illustrating a few embodiments for carrying out the invention, Fig. 1 is a view in side elevation, partly diagrammatic and partly in section, of a preferred form of apparatus for carrying out the invention; Fig. 2 is an end view in elevation of part of the apparatus; Fig. 3 is a fragmentary sectional view of a part of the still; Fig. 4 is a fragmentary transverse sectional view taken on a plane represented by line 4—4 of Fig. 3; Fig. 5 is a view similar to Fig. 1 of another form of apparatus; Fig. 6 is a similar view of still another form of the apparatus; Fig. 7 is a bottom plan view, partly in section of part of the apparatus shown in Fig. 6; and, Fig. 8 is a longitudinal sectional view of a modified part of the apparatus.

Referring more particularly to Figs. 1, 2, 3 and 4 of the drawings, the preferred embodiment selected to illustrate the invention, comprises an elongated still or cracking chamber 1, preferably of cylindrical or drum type and having near the ends thereof downwardly directed sluice-ways 3 and 4 connected at their lower ends to transverse drums 5 and 6, of which the former is preferably at a lower elevation than the latter. The drums 5 and 6 are connected together by a bank of preferably substantially parallel tubes 7 for completing the circulating part of the apparatus, forming a closed cyclic channel.

At the forward end of the drum 1 enters a supply pipe or conduit 8 which extends, preferably, to and into the upper end of the sluice-way 3 and having a short discharge end 9 extending but a short distance in the upper end portion of the sluice-way 3. If desired, the sluice-way 3 may include a propeller 10 driven by a suitable shaft 11 extending upwardly through the drum 1 and operated by suitable operating mechanism whereby the propeller may mechanically create a rapid circulation through the apparatus.

From the upper part of the drum 1 and toward the forward end thereof is connected a vapor conduit 12 for conducting off the vapors or distillates extracted from the contents of the drum 1 during the operation of the apparatus.

During the operation of distilling or cracking substances, particularly oil, a certain amount or portion of carbon is formed. For the purpose of carrying off such material, particularly from the drum 6, and, if desired, from other points such as the rear end of the drum 1 and from the drum 5, the invention comprehends one or more conducting conduits or ducts 13, 14 and 15 respectively connected to the drums 6, 5 and 1 as clearly shown in Fig. 1 of the drawings. Each of these ducts is controlled by a valve 16, 17 or 18 and leads to a common duct leading to an evaporating chamber or vaporizer or expander 20 and being provided with a control valve 21 as clearly shown in Fig. 1 of the drawings.

The vaporizer is preferably in the form of a hollow cylinder or drum and has connected at one end thereof a conduit 19 and at the other end thereof, at a low point, an outlet conduit 22 leading to a manifold 23 to which are connected a plurality of conduits or ducts 24 controlled by valves 25 and each leading to a settling tank or receptacle 26.

The evaporator shown in Fig. 1 has therein a diaphragm 27 preferably in the form of a plate supported within the vaporizer by the curved side wall portions of the receptacle 20 and extends longitudinally therein but leaving a space between an end 28 thereof and the end wall 29 for the downflow of material from the plate or diaphragm 27 to the discharge duct 22 as clearly shown in Fig. 1 of the drawings. At the upper part of the evaporator may be provided a plurality of ducts or conduits 30 which extend laterally and downwardly to a manifold 31, the latter located laterally adjacent to the vaporizer 20 and preferably on the same level thereof. From the manifold, preferably at one end thereof, leads a discharge conduit 32 connected to a suitable condensing means such as a coil 33. The latter is merely shown diagrammatically and is intended to illustrate any form of condensing device.

The vaporizer may be used with or without the plate 27 and may be in the form shown in Fig. 8 wherein the plate 27 is omitted, the remainder of the structure being identical with that described in connection with and shown in Fig. 1 of the drawings.

For the purpose of aiding in efficiently conducting off the residua or flush from the drums 6, 5 and 1, the inlet ends of the conduits 13, 14 and 15 are preferably connected to collector devices located in the lower parts of said drums. Such a device is shown in detail in Figs. 3 and 4 of the drawings. In the particular device shown, which is in connection with drum 6 but which may be illustrative of the other drums, the inlet end of conduit 13 extends downwardly with a throat portion 34 connected to an elongated passage 35 provided with a plurality of openings or ports 36 in the lower part thereof and distributed throughout the length thereof. These ports are located a short distance from the bottom of the drums so that the lower parts of the contents, such as the residuum or flush material, containing carbon particles, adsorbent particles and excess oil may readily find passage under the pressure prevailing in the still, through the ports 36 into the passage 35 and hence through the throat 34 and into the duct 13. To aid in withdrawing the residuum or flush material near the bottom of the drums, over passage 35 may be located a hood 37 having its sides resting upon the bottom wall of the drum and provided with lateral openings 38 for the passage of the residuum or material to be flushed out from the interior of the drum into the interior of the hood and beneath the ports 36 of the passage 35.

Each of the settling devices or receptacles 26 is preferably of elongated cylindrical or drum form and provided with a plurality of manholes 39 and 40, as at the ends and bottom portions of the receptacle 26. It is to be understood that these manholes may be provided at any desired part of the drum 26 and in any number desired. Opposite the discharge end 41 of the duct 24 is located a baffling plate 42 whereby the material discharged into the receptacle 26 may hit the baffle plate and flow slowly from the edges thereof into the contents of the receptacle without producing any currents or eddies in the contents of the receptacle. At the other end of the receptacle is provided a discharge pipe or duct 43 which acts as a decanting means for conducting off the unsettled oil to a locus of use. By baffling the discharge of the material entering the receptacle 26, the contents of the same may flow very slowly from one end of the receptacle to the other end, namely the decanting end, so that the settling of the heavier material may occur during the slow passage of the contents. It has been found that the unsettled material or oil at the surface or upper part of the receptacle 26 will be substantially without any colloidal or suspended particles of carbon, adsorbent or the like and the oil passing through the ducts 43 is in condition to be used as fuel oil or the like.

In Fig. 5 is shown an alternate construction with substantially corresponding parts to that shown in the figures above described, the still comprising a drum 1, sluice-ways 3 and 4 leading into headers 44 and 45 connected by a bank of tubes 46. The ducts 13, 14 and 15 are respectively connected to the headers 45, 44 and the drum 1 and similarly to the manner of connecting the same in the still shown in Fig. 1 of the drawings.

In Figs. 6 and 7 is shown a further form wherein a vertical drum 47 may correspond to the drum 1 of the apparatus above described, or a reaction chamber of a still in which the oil, or the like, may be previously heated, and the extraction of the distillates may be effected in the reaction chamber. A fluid inlet conduit 8 for the material, such as the heated oil, is connected thereto to convey the same into the chamber, and the vapors extracted therein may be carried off through conduit 12, similar to that of the forms shown in Figs. 1 and 5. A conduit 48, corresponding to conduit 13, of the form shown in Fig. 1, leads from the lower part of the still 47 and is preferably in the form of a spider 49 having curved branches which are perforated at the lower parts thereof to form inlet ports 50 through which may pass the residuum or flush material from the lower end portion of the drum 47. This spider form of device is an alternate of that shown in Figs. 3 and 4 of the drawings.

While the particular apparatus above described are merely illustrative, it is to be understood that the invention comprehends the use of any other type of still together with the vaporizer with or without the settling tank as herein described and illustrated upon the drawings, it also being understood that other forms of vaporizers and settling devices may be used.

In the operation of the device the oil or other material to be distilled is regularly fed, together with the desired amount of adsorptive substance and the like, either continuously or intermittently, such as through the pipe 8 or into any convenient part of the apparatus. The propeller aids in circulating the shell contents downwardly in the sluice-way 3, through the drum 5, the tubes 7, drum 6, upwardly in sluice-way 4, into the drum 1, returning toward the sluice-way 3. This circulation through the tubes is effected at much higher velocities than could formerly be obtained. The heating is applied, of course, to the tubes 7 and other parts as is usual in heating a still of this type.

If thermal convection were used alone it would be impossible to secure as great or greater velocity than one foot per second through the tubes. This would be far too low a velocity to effect any distribution of the adsorbent. With the combined action of the propeller and thermal convection a high velocity or rapid flow is obtained sufficient to produce the necessary dispersion of the adsorbent. It has been found that a rate of flow through the tubes of about 9 feet per second gives very satisfactory results.

Vapors or distillates will collect above the contents in the drum 1 and be carried off through the vapor conduit 12 to the desired point.

During the process of distillation, particularly with oil, carbon is usually formed and if not properly treated will ordinarily be deposited in the still and become encrusted or baked upon the walls of the still, particularly in the drum 6. In order that this produced material may not remain or be deposited in the still the invention comprehends the idea of feeding the material to be distilled regularly and to conduct off, from the selected points of the still, the flush material in a relatively large quantity. In order that the deposit will not be formed into a hard material the oil is treated with an adsorbent in a relatively small portion. This acts to maintain the carbon particles or the like in colloidal form whereby it may be carried away in suspended form or the like with an excess amount of oil, to the vaporizing device. When oil is treated in the presence of an adsorbent or adsorptive substance, the latter will act upon or in connectiton with the impurities or foreign substances in the oil or petroleum or the like, and particularly upon or in connection with the carbon freed in the treatment of the contents of the still. The adsorbent is added to the charge so that the oil and adsorbent are thoroughly mixed before entry into the still, only a small portion of adsorbent being so added. The action of the adsorbent, as determined by experiments, appears to be that the adsorbent, particularly lime, selectively adsorbs asphaltene bodies which have been produced as a degradation product of the reactions involved in cracking. In their degradation these asphaltenes, for the most part, hold on to the sulphur originally present in the charging stock. The final step in the degradation of asphaltene is carbon. When these asphaltenes go to carbon, the sulphur held in the asphaltene molecule is liberated as active sulphur, probably in the form of hydrogen sulphide. This action takes place within the lime masses in contact with an alkaline body which immediately enters in reaction with it. The fact that the lime in this way neutralizes the hydrogen sulphide or other sulphur body prevents its action upon the metal of the still, thus corrosion is substantially reduced. Furthermore, since iron sulphide acts as a binding agent in the consolidation of carbon masses, (hard carbon formation), and since the use of lime, in correct amounts, prevents a formation of iron sulphide, therefore the use of this or like adsorbent serves to allow the carbon produced to remain in an unconsolidated form. This action is fundamentally inherent in the use of lime or like adsorbent, when used in the amounts to act as an adsorbent and not as a catalyzer. There is a difference in the action of lime or like substance in large amounts and the action thereof in small amounts. In this invention the lime is intimately or widely dispersed or distributed throughout the whole mass of material in the circuit of the still. This dispersed condition achieves a fundamental effect not possible when lime is used in large quantities and particularly in large masses, as heretofore used. Lime in large amounts and particularly in large masses will catalyze the formation of carbon through local overheating and coking which is the condition which this invention avoids. This is avoided by the discovery of using only so much as is required to neutralize, so to speak, the particular amount of the deleterious substances freed in the cracking action. In other words, a large amount of lime will catalyze the production of coke while a small amount of it will by reason of its adsorbent action give the desired carbon characteristics.

Accordingly, in this invention, the carbon particles and impurities appear to be held in a sort of suspended or fluidal state and may be readily drawn off or flushed out with excess oil from the still, the oil apparently acting as a carrier or vehicle, this flushing action being effected at such a rate as to prevent any accumulation such that no local overheating develops and hence no coke is formed. Thus the removal or drawing-off or flushing out of the material is easily effected. The foreign bodies or impurities and carbon particles that may be acted upon by the adsorbent may be such as finely divided or colloidal carbon, complex tarry compounds of high molecular weight, dissolved coloring matter as well as traces of suspended alkali, acid and moisture, and also certain sulphonates and similar compounds, residual from certain oil treatments. All of these ingredients, in the present invention, are dispersed or distributed throughout the whole mass or contents in the still and are caused to be continuously drawn out through the ducts 13 or 14 or 15, selectively, into the vaporizing chamber. There are many adsorbents or adsorptive materials that may be used for this purpose. Examples of those that may be used are the following: Alumina, bauxite, kaolinite, China clay, bentonite, magnesite, iron oxide, bone ash, bog iron ore, coke, coal, clays of various types, particularly acid treated clays, fuller's earth, alkaline earth oxides, such as calcium oxide or lime in its various forms, and magnesium oxide; and silica-gel, such as that formed by mixing sodium silicate and sulphuric acid and allowing to rest for a given period to set into a homogeneous jelly-like mass, which is called hydrogel, and which is ground, lixiviated, dried and activated to form ultramicroscopic pores.

While any one of these, and others not named, may be used as an adsorbent, I prefer to make use of lime or fuller's earth or the like.

While the oil is being cracked or distilled, it is preferable that an excess amount of it be fed into the still, that is, a substantial amount greater than is necessary to just supply the amount that is being distilled or cracked so that it will act as a flushing medium or carrier for the colloidal or suspended particles of carbon and other similar materials, so as to carry the same off continually from the drums and into the vaporizing device.

What has been referred to as the first or initial residuum or "flush" is not in fact a residuum in the usual sense of the word but is in fact a withdrawal of a portion of the stock in the still and may be termed wash oil or "flush" and it is an average sample of the stock in the still or circuit thereof, together with particles of carbon, adsorbent and impurities, in dispersed and distributed suspended or like condition, so that the flushed mass is in the nature of homogeneity. It is withdrawn to the extent or in amount or rate equal to about 45 to 65 percent of the oil fed or charged into the circuit of the still. Its purpose is to wash out, flush out or carry away the dispersed lime and suspended and finely divided carbon, and combined impurities and the like. There is no settling out of these substances at any point of the circuit of the system except in the settling tank 26. It has been found that regardless of the length of the run, the amount of such material present in the still at the end of the run is substantially fixed and substantially equal to that present at any instant of time during such run. It is this amount of such material that remains in the still at the end of a run and is removed therefrom in the form of friable powder at the cleaning after shut-down, and this is the same irrespective of the length of the run. In other words, it is what is in the charge when the still is shut down. However, it can be flushed out by continuing the flushing-out or drawing-off operation during the shutting down.

Also, what has been referred to as the second or intermediate residuum or "flush" is not a residuum in the usual sense of the word. The first or initial residuum or flush referred to in the preceding paragraph withdrawn from the still at the desired point in amounts ranging from 45 to 65 percent of the oil being charged and being in substantially homogeneous condition passes to the expansion chamber or evaporator 20 where vapors are released by virtue of the release of pressure and the contained heat. The vapors pass off and are condensed to be recycled with the charging stock to the still. The remainder, still in a homogeneous condition is flowed to the settling tank. The carbonaceous and lime materials are carried with it.

The third or final residuum is a special form of settlings in the settling tank, the lime and carbonaceous material sinking to the bottom and becoming quiescent. This is the first settling action that occurs in the whole system. The supernatent liquid, is substantially free of suspended matter, is drawn off to fuel tanks, and the accumulated solids in the bottom of the settling tank are discharged, when desired, through the discharge means 40. Such material is in the form of a sludge and is more or less saturated with a small amount of oil, usually designated as fuel oil. In previous processes the materials usually referred to as residuum are the heavy ends of the final separation, or the ultimate degraded products, and are entirely different from the settlings of this process. Furthermore, this final residuum is in no sense produced within the cyclic path involved in the cracking.

The flushing of wash oil or "flush" from the circuit of the system is in large proportion amounting to from 45 to 65 percent of the oil fed to the still. The "flush" or flushed-out material is of the same characteristics as that in the still, or in other words is an average sample of the still contents. The portion thus flushed out is subjected to expansion in the expander or separator where the distillates or vapors pass to a condenser, and is recycled with the charging stock for the further treatment in the still. The remainder of the material in the expander is still of homogeneous character and is flowed into the settling tank where the heavier particles and the like settle into a thick black mass, saturated with oil (fuel oil) and is drawn off as desired. This mass comprises carbon, the adsorbent, and compounds of the adsorbent and sulphur and other impurities. The oil, free of these settlings, may be drawn off from the upper part of the settling tank. This is the first place in the system where there is any residuum in the ordinary sense of the word, yet this residuum is of a different character than that heretofore produced in other systems.

It will be noted that the distilling action is in the presence of heat and under pressure. The flow of the flush material from the still may be controlled by the valves 16 or 17 or 18, whichever duct is selected to be used, and the rate of flow into the vaporizer as desired. As the flush material passes into the evaporator, it will be caused to pass either over the surface of the walls thereof or over the top surface of the diaphragm so as to spread the flush material into a large area surface or into the oil mass for the extraction thereof of further distillates. This material in the vaporizer is subjected to reduced pressure, usually about atmospheric pressure, but it is to be understood a greater or less pressure may be used so long as it is of less pressure than that used in the still. The effect of this reduced pressure is to cause the contained heat in the flush material to force out or extract the distillates from the material which will pass to the upper part of the vaporizer and into the ducts 30 and the manifold 31. The vapors may then be drawn off through the duct 32 to the condensing device 33 and recycled with the charging stock of the still or collected in storage as desired. The remaining material in the vaporizer, which may be termed the secondary or intermediate residuum or flush, may then flow slowly through the duct 22 into the manifold 23 and into any one of the settling tanks 26 as may have the conduit 24 open thereto. This material will flow slowly into the chamber 26 upon the baffling plate 42 where it will spread to the edges thereof and flow slowly into the contents of the receptacle. This baffling will effect such slow movement of the material into the receptacle that there will not be produced any currents or eddies in the receptacle. The flow from one end to the other end of receptacle 26 will be very slow such that all the suspended particles and colloidal matter will have a chance to settle to the lower part of the receptacle and the unsettled material or fuel oil will remain in the upper part of the receptacle and be carried off or decanted through the passage or duct 43.

This residuum, which may be termed the final residuum, but more properly, the settlings in the receptacle 26, may be removed, when sufficiently accumulated, by the removal of the covers in the manholes 39 and 40. This residuum, when removed, may be used as fuel material, briquetted or otherwise used as a by-product.

The present invention comprises or involves at least the three following fundamental features, namely, the rapid and repeated circulation of the charge in the still, the flushing out of a substantial amount of such stock, and the dispersing of an adsorptive in the stock to prevent the coking of carbon and to eradicate any corrosive constituent. The propeller 10, driven at a suitable speed, forces a rapid and repeated circulation of the oil charge in the circuit of the still, and at a high velocity, a velocity much higher than has heretofore been considered possible or practical. Furthermore, this circulation is independent of the rate of feed and is in no degree affected thereby. In the present invention the lineal velocity in the tubes is in excess of four feet per second and in experiments made the velocities of about ten to twelve feet per second were found to be very satisfactory. These high velocities appear to afford a higher rate of heat transfer and to reduce the thickness of the slower moving oil film or layer on the inner surface of the tubes. As a consequence of these facts this invention affords a minimum "overheating" of the charge. This fundamental advantage is indicated by the fact that the rate of gasoline production is substantially the same when operating on recycle stocks produced by means of this invention as it is when operating on virgin stocks at any given temperature. These high velocities tie in fundamentally with the use of lime as practised under this invention in that they make possible the intimate dispersion of the adsorbent and insure the essential homogeneity of the oil flushed from the still. So far as I know this is true of no other process. The flushing-out of a substantial average sample of the stock at a rate compared to that being charged effects a scavenging of all foreign products and impurities while in a state of fluidity. The use of an adsorbent, such as lime, has at least three important effects, namely the maintaining of the carbon in a finely divided and non-consolidating state or condition, the prevention of corrosion by eradicating any impurities or changing the same, such as sulphur, into a form that is not corrosive, and the promotion and formation of a product having compounds of anti-knock characteristics.

The parts of the apparatus are so located that the materials will travel, after reaching the evaporator, all by gravity without the necessity of force pumps and other pressure devices. It will be understood, if desired, a second evaporator may be used in between the evaporator described and the settling device. This process may be carried out to any desired number of evaporators, depending upon the degree of extraction of distillates desired.

While I have herein described and upon the drawings illustrated a few illustrative embodiments of the invention, it is to be understood that the invention is not limited to the particular details, constructions and arrangements of parts, described and illustrated, but that other constructions, arrangements of parts, and details are comprehended by the invention without departing from the spirit thereof.

Having thus described my invention, I claim:

1. A process of cracking higher boiling point hydrocarbon oils to form lower boiling point hydrocarbon oils which comprises subjecting a body of oil to be cracked to distillation in a container under superatmospheric pressure and at a cracking temperature, feeding into said body of oil during said process charging stock consisting of oil commingled with particles of a finely divided adsorptive material, adsorbing with such divided material the particles of carbon-forming substance in the cracking oil, maintaining the particles of divided material in a dispersed condition throughout the oil and withdrawing during said process a portion of the oil containing such dispersed adsorptive particles carrying the adsorbed substance; the amount of adsorptive material in the oil fed in and the amount of such material carrying the adsorbed substance in the oil withdrawn being so regulated as to maintain the body of oil undergoing distillation below that point of saturation with such material as would otherwise cause deposition of such material upon the heating surfaces of the container.

2. A process of treating hydrocarbon oils consisting in flowing the oil through a channel extending in part through a heating zone, maintaining the oil in said channel at a pressure and temperature sufficient to crack the oil, adsorbing the particles of carbon-forming material in the cracking oil with a finely divided mineral material, such as lime, dispersed throughout the oil, and maintaining such carbon-laden material in a suspended condition by mechanical agitation of the oil to prevent consolidation of the carbon and its depositing upon the inner walls of the channel.

3. The process of cracking oil which comprises maintaining a main body of oil at a cracking temperature and pressure, continuously taking off vapors therefrom; supplying such quantity of divided adsorptive material to the main body of oil as may be maintained in dispersed suspension therethrough, maintaining the adsorptive material in such dispersed condition, adsorptive the carbon-forming material in the oil being cracked and retaining it in suspension in the oil with the divided material; continuously supplying fresh oil to maintain in proper volume said body of oil undergoing cracking; continuously withdrawing oil containing the suspended carbon-laden material for the purpose of preventing an increase of such material in the main body of oil over a predetermined proportion; reducing the pressure on said withdrawn oil and carbon-laden material; taking off vapors from the withdrawn oil to increase the concentration of the carbon-laden material and reduce the volume of oil containing such suspended material; and effecting a separation of the solid material from the oil by stagnating the oil so as to precipitate the concentrated solids by settling and decanting off the supernatent liquid.

4. The process of cracking oil which comprises subjecting the oil to a cracking temperature under pressure in a still, supplying to the oil such quantity of adsorptive material in divided form as may be maintained in suspension throughout the oil being cracked, maintaining the divided material in a suspended condition throughout the oil by rapid forced circulation of the oil through a channel of said still, retaining the carbon in such channel in non-consolidated form by association with the particles of suspended divided material, conducting the oil relatively quickly through a heated portion of said channel, and withdrawing from said channel oil containing the suspended particles of divided material with the associated carbon.

5. A process of cracking oil, comprising subjecting the oil to heat and pressure, taking off vapors from said oil, dispersing such quantity of divided lime throughout said oil as will adsorb sufficient of the carbon and carbon-forming substances in the cracking oil to prevent their consolidation, supplying fresh oil, and continuously withdrawing a sufficient quantity of the oil containing suspended lime with adhering carbonaceous material to prevent deposition of said material.

6. The process of converting a heavy hydrocarbon oil into a lighter product, comprising flowing the oil in a stream, subjecting the oil to cracking heat and pressure, supplying such quantity of lime to the oil during the cracking treatment that carbon and carbon-forming substances are adsorbed and retained in suspension by the lime, and withdrawing a portion of the mixture to relieve the flowing stream of oil of any excess quantity of such lime.

7. A process of cracking oil including the steps of continuously feeding into a body of circulating oil, charging stock comprising oil mixed with a finely divided mineral substance having a characteristic adsorptive action for carbon and carbon-forming material; continuously maintaining such mineral substance in a dispersed condition throughout said body of oil; maintaining superatmospheric pressure on said body of circulating oil; withdrawing in a substantially continuous manner a portion of said circulating oil and dispersed mineral substance; the amount of finely divided mineral substance fed into said body of circulating oil being so restricted as to permit of its being maintained in a uniformly dispersed condition throughout the said body of circulating oil.

8. In an oil cracking process in which carbon-forming material is produced, the steps of charging into a body of oil subjected to cracking conditions additional oil and a finely divided mineral substance having a characteristic adsorptive action for carbon-forming material; dispersing said finely divided mineral substance throughout said body of oil; withdrawing from said body of oil during said process a portion of said oil and dispersed mineral substance; the amount of said finely divided mineral substance charged into said body of oil being so regulated as to permit of its intimate contact in suspension with said carbon-forming material.

9. In a process of cracking oil, the steps of dispersing throughout a body of circulating oil, finely divided particles of lime; adsorbing particles of carbon-forming substances in the cracking oil by said dispersed particles of lime; maintaining in a homogeneous condition the oil and the dispersed particles of carbon-laden lime by rapid circulation of the oil; and relieving said body of oil of carbonaceous and carbon-forming substances by drawing off a portion of such homogeneous mixture of oil and particles of carbon-laden lime.

10. In a process of cracking oil, the steps of charging oil during the cracking process into a still; dispersing lime in a finely divided condition throughout the oil in said still; contacting with said dispersed lime carbon and carbon-forming material in suspension in the oil; intimately associating the lime with such material; and removing from the still during the cracking process such proportion of the lime so associated with said material as to maintain the still free from consolidated carbon.

11. A method of removing carbon and carbon-forming substances from a body of oil undergoing distillation wherein said body of oil is subjected to heat treatment productive of carbon and carbon-forming substances, which comprises the steps of dispersing and retaining in suspension throughout said body of oil a finely divided adsorptive material, such as lime; causing the association therewith of carbon and carbon-forming substances in the oil by contacting with the suspended adsorptive material; maintaining a suspended distribution throughout the oil of such carbon associated material; and withdrawing during said distillation a portion of said body of oil containing suspended carbon associated material.

12. A process of converting heavier hydrocarbon oil into lighter hydrocarbon oil which includes the steps of flowing said heavier oil commingled with lime particles through a channel extending in part through a heating zone; maintaining the oil in said channel at a pressure and temperature sufficient to crack the oil; contacting and retaining carbon and carbon-forming material produced in the cracking oil in intimate association with said lime particles; and maintaining such a rapid flow of the oil through the portion of said channel in the heating zone that the lime particles and associated carbonaceous material are carried therethrough in suspension in the oil.

13. A process of cracking oil including the steps of continuously feeding into a body of circulating oil, charging stock comprising oil and such percentage of a finely divided mineral adsorptive material as can be maintained in a dispersed condition throughout said body of circulating oil; subjecting the mixture of oil and adsorptive material to heat and pressure; contacting and retaining in intimate association with said dispersed adsorptive material carbon and carbon-forming substances in the cracking oil; conducting off in a subtsantially continuous manner adsorptive material including said retained carbon and carbon-forming substances together with a portion of said circulating oil through an evaporating chamber to a settling tank; and releasing the pressure on the withdrawn mixture in the evaporating chamber to distill off a portion of the oil by its contained heat.

14. The method of preventing deposits of carbon and carbon-forming substances during the cracking of oil in a still which comprises flowing the oil through said still; supplying to the still during said cracking such quantity of divided lime as may be maintained in sufficiently dispersed distribution throughout the oil therein to contact the carbon and carbon-forming substances in suspension and retain said substances in a non-consolidated form, and withdrawing from the still during said cracking a portion of the oil carrying lime associated with carbonaceous substances.

15. The method of preventing carbon and carbon-forming substances produced in cracking oil from consolidating into hard deposits which consists in continuously supplying said oil to a body of oil undergoing cracking, dispersing lime in a divided condition through said body of oil; contacting and removing carbon and carbon-forming material by intimate association with said lime; and withdrawing during said cracking a portion of the oil and dispersed lime with associated carbon from said body of oil.

16. A method of treating carbon and carbon-forming substances to prevent their consolidation during a cracking operation in an oil still, comprising adding finely divided particles of lime to the oil in said still; contacting and adsorbing carbon and carbon-forming substances with said lime whereby said carbon and carbon-forming substances may be carried off with the lime in a stream of oil drawn from the still during said cracking operation.

17. The process of converting a heavy hydrocarbon oil into a lighter product, comprising flowing the oil in a stream; subjecting the oil in said stream to a cracking heat and pressure; and supplying and dispersing to and throughout said stream of oil a quantity of finely divided lime sufficient for adsorbing and retaining carbon and carbon-forming substances in suspension.

18. The process of converting a heavy hydrocarbon oil into a lighter product, comprising continuously flowing oil to be cracked through a tube; maintaining pressure on the oil in said tube; externally heating said tube and the oil flowing therethrough to a cracking temperature; supplying such quantity of lime to the oil flowing through said tube that carbon and carbon-forming substances are contacted and retained in association with said lime in the cracking oil; and maintaining such a rapid flow of the oil through said tube that the lime and associated carbonaceous material are carried through and out of said tube in suspension in the flowing oil.

19. The process of converting a heavy hydrocarbon oil into a lighter product, comprising flowing the oil in a stream; subjecting the oil in said stream to a cracking heat and pressure; supplying such quantity of lime to the oil in said stream that carbon and carbon-forming substances are adsorbed and retained in suspension by the lime; conducting a portion of the oil and suspended substances from said stream to a zone of reduced pressure where vapors are released; and withdrawing the unvaporized mixture of oil and suspended substances from said zone of reduced pressure.

20. The process of converting a heavy hydrocarbon oil into a lighter product, comprising flowing the oil in a stream; subjecting the oil in said stream to a cracking heat and pressure; and supplying and dispersing to and throughout said stream of oil a quantity of finely divided lime sufficient for contacting and maintaining in suspension with said lime carbon and carbon-forming substances in said stream of oil.

21. The process of converting a heavy hydrocarbon oil into a lighter product, comprising flowing the oil in a stream; subjecting the oil in said stream to a cracking heat and pressure; supplying and dispersing to and throughout said stream of oil a quantity of finely divided lime sufficient to intimately intermingle and associate with the carbon and carbon-forming material occurring in said process; retaining such material in suspension in said stream; and withdrawing during said process a portion of said oil from said stream together with its solid contents.

22. The process of converting a heavy hydrocarbon oil into a lighter product, comprising flowing the oil in a stream; subjecting the oil in said stream to a cracking heat and pressure; supplying a quantity of lime to the oil in said stream; maintaining said stream of oil in such rapid flow that the lime contained in the oil will be dispersed throughout said oil to form distributed nuclei; contacting particles of carbon and other solid carbonaceous material formed in the cracking stream of oil with said lime distributed nuclei; and retaining said particles of carbon and other solid carbonaceous material in intimate association with said lime distributed nuclei whereby said particles of carbon and other solid carbonaceous material are maintained in a nonconsolidated condition.

23. In an oil cracking process in which carbon-forming material is produced, the steps of charging into a body of oil subjected to cracking conditions additional oil and a finely divided mineral substance having a characteristic adsorptive action for carbon-forming material; dispersing said finely divided mineral substance in said body of oil; withdrawing from said body of oil during said process a portion of said oil and dispersed mineral substance; the amount of said finely divided mineral substance charged into said body of oil being so regulated as to permit of its intimate contact in suspension with said carbon-forming material.

24. The process of converting a heavy petroleum oil into a light one which consists in circulating the heavy oil in a closed ring, continuously heating a portion of the ring, maintaining a pressure on the portion of the ring so heated, continuously taking off light vapors from the ring, continuously adding oil to the ring, continuously adding a cracking agent to said ring to present nuclei for the deposition of carbon, agitating the whole to maintain said nuclei in a state of suspension, and withdrawing residuum including part of said cracking agent with its deposited carbon.

25. The process of converting a heavy petroleum oil into a light one which consists in circulating the heavy oil in a closed ring, continuously heating a portion of the ring, maintaining a pressure on the portion of the ring so heated, continuously taking off light vapors from the ring, continuously adding oil to the ring, continuously adding a cracking agent to said ring to present nuclei for the deposition of carbon, agitating the whole to maintain said nuclei in a state of suspension, and continuously withdrawing residuum including part of said cracking agent with its deposited carbon.

26. The process of converting higher boiling hydrocarbon oils into lower boiling hydrocarbon oils which comprises heating a flowing stream of liquid oil to raise it to a cracking temperature, passing the heated oil into a converting vessel under superatmospheric pressure, maintaining the oil in the vessel at a temperature suitable to active decomposition, leading away the evolved vapors, introducing a predetermined quantity of substantially non-aqueous lime into the fresh oil stream, before it attains a cracking temperature, and withdrawing during the process residual material and lime from the bottom of the converting vessel to prevent the accumulation of lime in the vessel.

27. The process of converting higher boiling hydrocarbon oils into lower boiling hydrocarbon oils which comprises heating a flowing stream of the liquid oil to raise it to a cracking temperature, passing the heated oil into a converting vessel under superatmospheric pressure, maintaining the oil in the vessel at a temperature suitable to active decomposition, leading away the evolved vapors, and continuously introducing a predetermined quantity of substantially nonaqueous lime into the fresh oil stream before it attains a cracking temperature.

28. In the process of converting higher boiling hydrocarbon oils into lower boiling hydrocarbon oils characterized by heating a flowing stream of the oil to a cracking temperature, passing the hot oil into a converting vessel in which a substantial body of liquid oil is maintained, continuously effecting decomposition of the oil in the vessel under superatmospheric pressure, the step of maintaining a predetermined and substantially constant quantity of substantially non-aqueous lime in the oil subjected to decomposition temperature.

29. In a process of converting higher boiling hydrocarbon oils into lower boiling hydrocarbons characterized by passing a stream of oil heated to a cracking temperature through a converting zone to a zone of less pressure than the converting zone, the steps of introducing to and withdrawing from the oil undergoing cracking in said process substantially non-aqueous lime in dispersed phase.

ULYSSES S. JENKINS.